Oct. 29, 1940.  G. B. RICKARD ET AL  2,219,398
SEGMENTAL PULP WHEEL
Filed Feb. 9, 1938  5 Sheets-Sheet 1
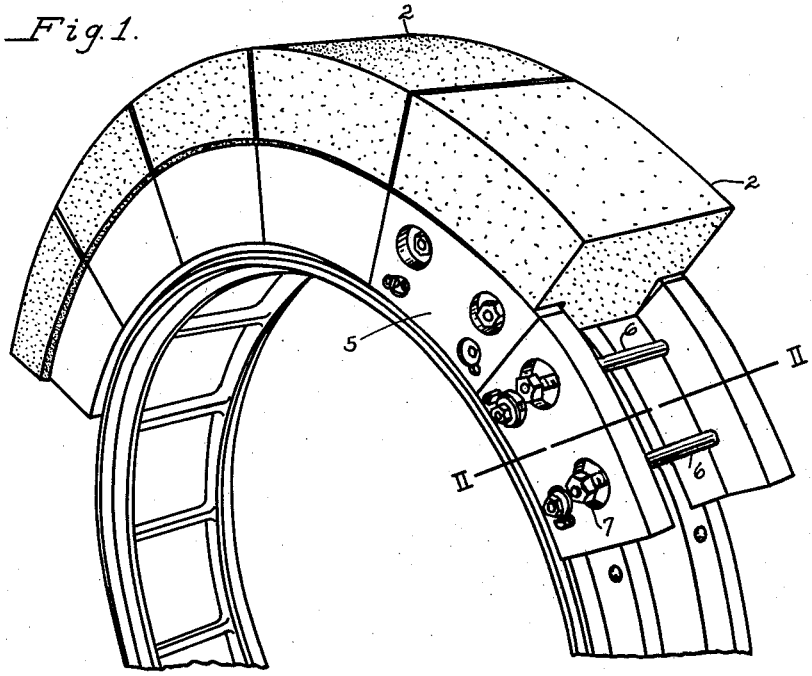
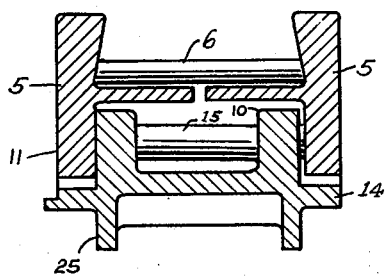
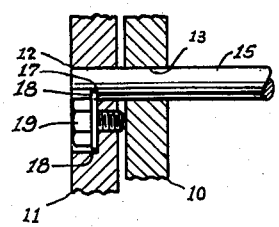
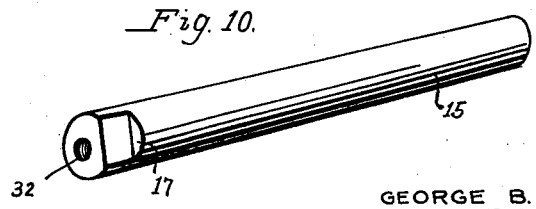
INVENTORS.
GEORGE B. RICKARD, DECEASED,
SARAH E. RICKARD, ADMINISTRATRIX,
HENRY P. KIRCHNER.
BY
ATTORNEY.

Oct. 29, 1940.    G. B. RICKARD ET AL    2,219,398
SEGMENTAL PULP WHEEL
Filed Feb. 9, 1938    5 Sheets-Sheet 2
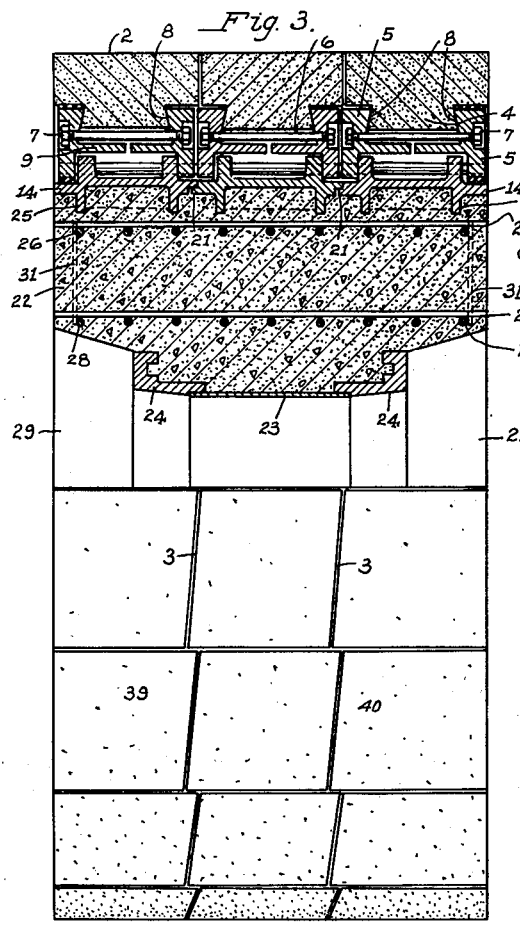
INVENTORS.
GEORGE B RICKARD, DECEASED,
SARAH E. RICKARD, ADMINISTRATRIX,
HENRY P. KIRCHNER.
BY R C Benner
ATTORNEY.

INVENTORS.
GEORGE B. RICKARD, DECEASED,
SARAH E. RICKARD, ADMINISTRATRIX,
HENRY P. KIRCHNER.

BY *R. C. Benner*

ATTORNEY.

Oct. 29, 1940.    G. B. RICKARD ET AL    2,219,398
SEGMENTAL PULP WHEEL
Filed Feb. 9, 1938    5 Sheets-Sheet 4

INVENTORS.
GEORGE B. RICKARD, DECEASED
SARAH E. RICKARD, ADMINISTRATRIX
HENRY P. KIRCHNER.
BY
ATTORNEY.

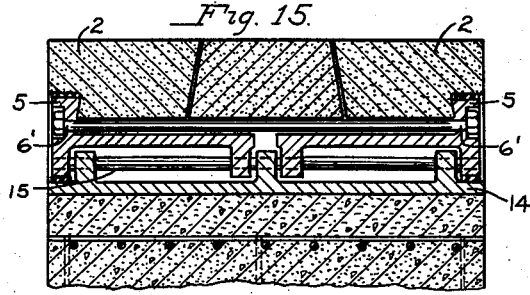
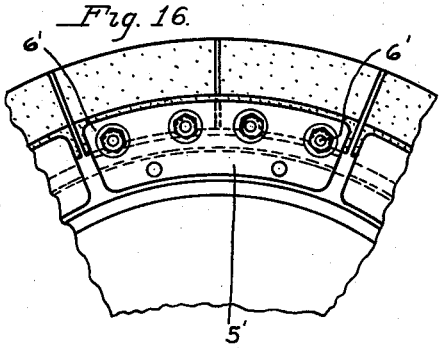
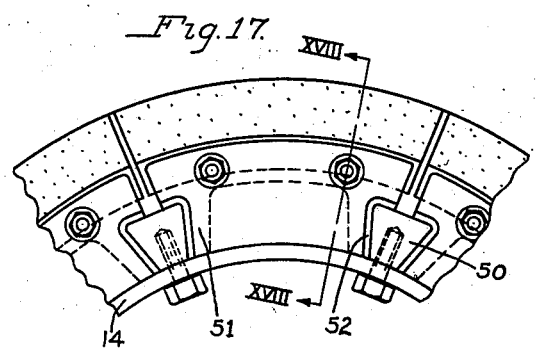
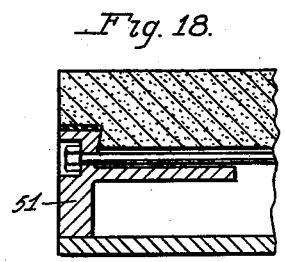
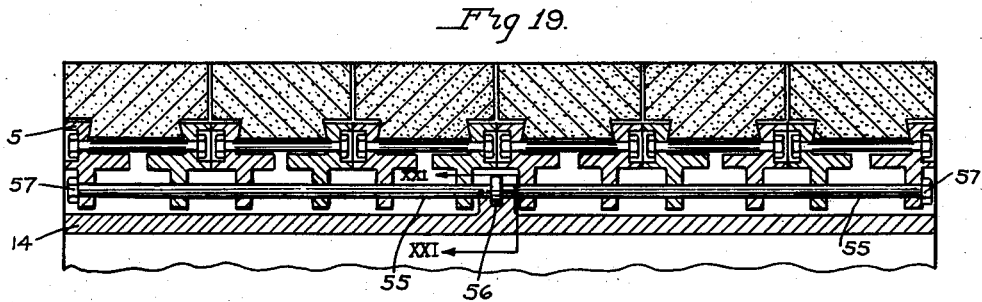
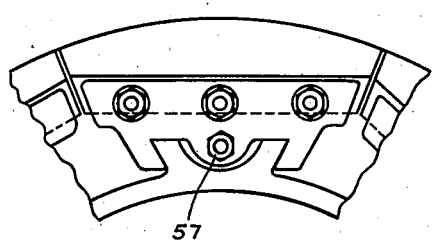
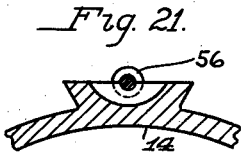

Patented Oct. 29, 1940

2,219,398

UNITED STATES PATENT OFFICE 2,219,398

SEGMENTAL PULP WHEEL

George B. Rickard, deceased, late of Niagara Falls, N. Y., by Sarah E. Rickard, administratrix, Niagara Falls, N. Y., and Henry P. Kirchner, Niagara Falls, N. Y., assignors to The Carborundum Company, Niagara Falls, N. Y., a corporation of Delaware Application February 9, 1938, Serial No. 189,644

10 Claims. (Cl. 51—207)

This invention relates to pulp grinding wheels and more particularly to segmental wheels of very large diameter and long axial dimensions such as are desired in the mass production of wood pulp.

Many structural difficulties arise from the large range of temperatures to which pulp wheels are subjected in northern latitudes where the temperature of the wheel may go as low as −40° centigrade when it is not in operation or when it is in transit. During grinding operations, on the other hand, the working surface of the wheel may be raised nearly to the temperature of boiling water by the friction between the wheel and the wet pulp wood. The difficulties caused by differences in thermal expansion are enhanced by large differences between the coefficient of thermal expansion of artificially bonded abrasive (having, for example, a vitrified clay bond) and that of the steel supports on which the abrasive segments are mounted.

Large pulp wheels are usually built up from a number of segments, since it is easier to produce an abrasive segment in which the bond and grain are substantially uniformly distributed and in which the bond is well matured throughout, than would be the case in making a large monolithic wheel from a mixture of abrasive grain and bond.

In building up a large pulp wheel from a number of abrasive segments, however, difficulties arise in assembling the segments on a metal drum in such a manner that the segments will be securely gripped and so uniformly distributed as to form a balanced wheel. Again the coefficient of expansion of an abrasive segment containing a vitrified clay bond may be only half of the coefficient of expansion of the metal support on which it is mounted, such supports being usually made of cast iron or steel to attain the necessary strength.

One of the objects of the present invention is, therefore, to facilitate the mounting of the abrasive segments and to prolong their usefulness by providing a pair of clamps for each segment, the clamps engaging a dovetailed inner projection of the abrasive segment and being secured firmly thereto. Another object of the invention is to locate the proper position of each segment on a rotatable mounting. Another related object of the invention is to facilitate removal of any abrasive segment which has become defective during the grinding operations without unduly disturbing the adjacent segments.

If it is desired to replace all the used segments with new segments, the central part can be used over again and new segments quickly mounted thereon, thereby effecting considerable saving in time and money as compared with the usual pulp wheel replacement.

The construction of a segmental pulp wheel made in accordance with the present invention is illustrated but not limited by means of the accompanying drawings in which:

Figure 1 is a perspective view of a portion of an abrasive annulus and of some of the metal parts used in mounting the segments;

Figure 2 is a transverse section of two opposed clamping plates and a supporting ring taken on the line II—II of Figure 1;

Figure 3 is an elevation partly in section of a segmental abrasive wheel viewed in a direction perpendicular to the axis of the wheel;

Figure 5 is a fragmentary section taken on the line V—V of Figure 4;

Figure 8 is a fragmentary side view of the supporting ring on which the abrasive segments are shown as mounted in Figure 1;

Figure 9 is a transverse section of the supporting ring shown in Figure 8, the section being taken on the line IX—IX of Figure 8;

Figure 10 is a perspective view of one of a pair of pins used to locate an abrasive segment together with its clamping plates on the supporting ring shown in Figure 8 and in Figure 9;

Figure 11 is an elevation of the pulp wheel mounted on a driving shaft;

Figure 14 is a fragmentary side view of the wheel shown in section in Figure 13;

Figure 15 is a fragmentary axial section of a modified segmental wheel in which a pair of clamps is used to clamp a plurality of segments in a row parallel to the axis of the wheel;

Figure 16 is a fragmentary end view of a segmental abrasive wheel in which a pair of clamps is used on a plurality of abrasive segments arranged on the periphery of the wheel support;

Figure 17 is a fragmentary end view of a segmental wheel in which clamped segments are fastened to a ring support by means of cast metal;

Figure 18 is a fragmentary section taken in a plane indicated by XVIII—XVIII in Figure 17;

Figure 19 is a partial axial section of a segmental abrasive wheel in which the clamped segments are supported in an axial direction by means of a long bolt which has a central anchorage;

Figure 20 is a fragmentary end view of the wheel illustrated in Figure 19; and

Figure 21 is a fragmentary section on the line XI—XXI of Figure 19.

Figure 4:
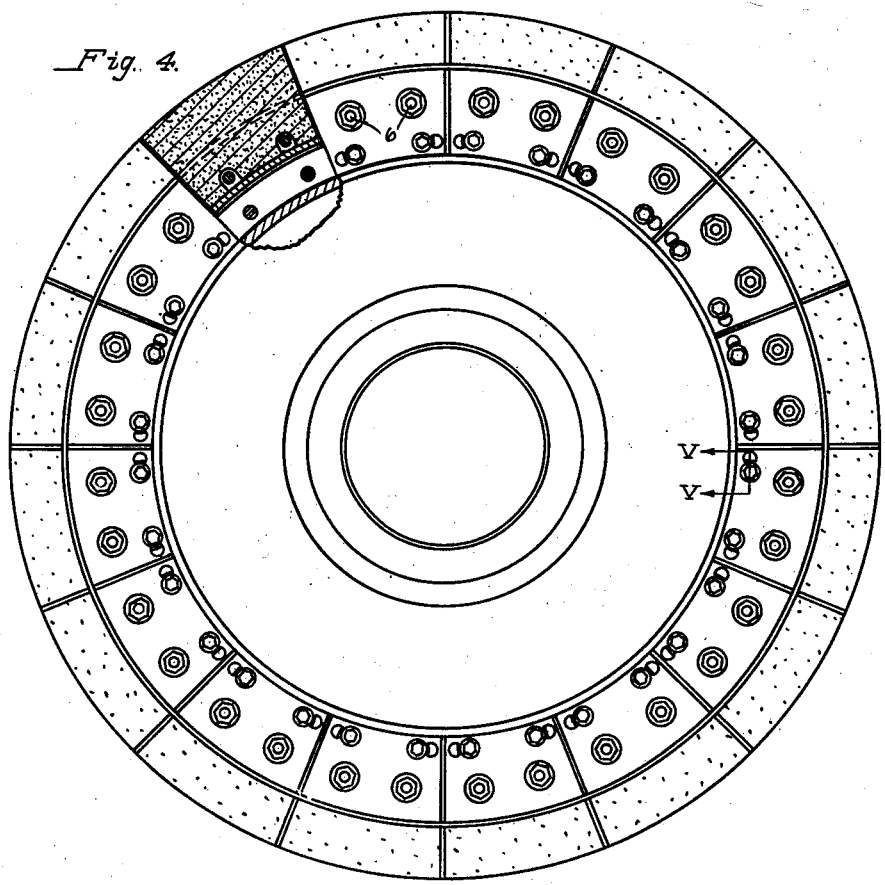
Figure 4 is an elevation partly in section of the wheel shown in Figure 3, the view being taken in a direction parallel to the axis.
Figure 6:
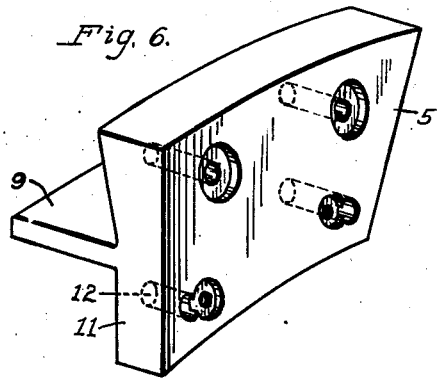
Figure 6 is a perspective view of one of the clamping plates shown in section in Figure 2, the holes that extend through the clamp being indicated by means of dashes.

Referring to the drawings in detail, the abrasive wheel (as shown particularly in Figure 3 and in Figure 11) is made up of a number of annuli, each of which consists of a plurality of abrasive segments 2.

The joints 3 between adjacent abrasive annuli do not lie exactly in a plane perpendicular to the axis of the wheel; but are arranged in successive planes each of which makes a small angle with a plane perpendicular to the axis of the wheel. In this way, the grinding action of the wheel on the log is made more continuous and the wear on the joint material is less than would be the case if the joints between adjacent annuli were all arranged in planes perpendicular to the axis of the wheel. The material of which the joints are made is much softer than the bonded abrasive and will be described in more detail below.

Figure 7:
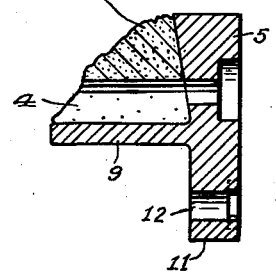
Figure 7 is a fragmentary transverse section of the clamping plate shown in Figure 6.

Each abrasive segment 2 has a dovetail base 4 which can be clamped between a pair of iron or steel clamps 5 which are firmly pressed against the base 4 by means of a pair of bolts 6 and clamping nuts 7. The bolts 6 extend across the segments to which they are attached in a direction parallel to the axis of the wheel and are made of a nickel steel alloy having approximately the same coefficient of expansion as the bonded abrasive segments. Residual differences in expansion can be taken care of by means of a thin layer 8 of waterproof flexible sheet material such as that obtainable under the trade name "Oilpac." The clamping plates 5 extend under the bases of the abrasive segments as indicated at 9 in Figures 3 and 7, and are therefore adapted to give strong support to the abrasive segments, while temperature stresses are minimized by the similarity of the thermal expansion characteristics of the bolts 6 and of the abrasive segments 2 and by the use of fibrous packing between at least one of the lateral faces of the dovetail abrasive projection and the adjacent clamping plate. The clamps 5 are also provided with projections 11 which contain openings 12 that register with corresponding openings 13 in the peripheral flanges 10 that project outwardly from the supporting ring 14.

A reinforced segment can then be placed in position on the periphery of the ring 14 with the aid of pins 15 which are inserted first into an opening 12 of one of the clamping plates, then in succession through openings 13 in the supporting ring, and finally into an opening 12 in the second clamping plate which is attached to the opposite side of the abrasive segment. A second pin 15 is then inserted through corresponding openings in the clamping plates and in the peripheral flanges of the supporting ring. The pair of pins secures the reinforced abrasive segment in proper position on the supporting ring 14.

The openings 13 in the supporting ring 14 are so distributed circumferentially that there is a small gap between any two adjacent segments. These gaps are filled with joint material that is sufficiently yielding to permit circumferential expansion or contraction of the segments as a result of changes of temperature. A suitable material for these joints between abrasive segments can be made, for example, by impregnating two sheets of fabric with reactive synthetic resin and joining the two sheets with a rubber composition. The synthetic resin is then cured by heating, leaving a resilient sheet with relatively rigid supporting surfaces which can be inserted between two adjacent abrasive segments and attached to the surfaces of the segments by means of a suitable cold-setting cement.

The pins 15 are of general cylindrical shape, but the outer cylindrical surface is ground off adjacent one end to provide a shoulder 17 as shown particularly in Figure 10. A washer 18 is placed against the outer surface of a clamping plate or in a recess in the surface of the clamping plate as shown in Figure 5, and is held there by means of a bolt 19 which engages a threaded opening in the clamp plate. The washer 18 projects sufficiently over the shoulder 17 to prevent turning of the pin 15 and to prevent outward movement of the pin 15.

Some suitable filler such as a mixture of litharge and glycerine may be used to fill openings in the clamping plates made for the insertion of bolts or pins.

After a number of abrasive annuli have been completed, one of the annuli is laid on a table with its axis in a vertical position. The upper surfaces of the abrasive segments are primed with a suitable cold-setting cement, and a second annulus is laid concentrically on the first annulus, its lower surface having been primed with cold-setting cement sufficient in amount (in combination with the layer of cement on the first annulus) to form a joint between the two annuli. Other annuli can be added in a similar manner to build up the abrasive wheel to the desired length in an axial direction. The supporting rings for the adjoining annuli are provided with interlocking flanges as indicated at 21 in Figure 3.

The abrasive rim in the completed article consists of a plurality of abrasive annuli, each of which is mounted on a supporting ring, and the rim is built up so that the supporting rings are symmetrically disposed around a common axis which coincides with the axis of rotation of the driving shaft for the wheel. A reinforced concrete core is provided for the wheel as indicated in section at 22 in Figure 3. This concrete core is bounded on the inner surface by a metal sleeve 23 and metal bushings 24. On the outer side the concrete core is bounded by the supporting rings 14. These rings 14 have inwardly projecting flanges 25 which are anchored in the concrete. The concrete core is reinforced near its outer boundary by means of a helical coil 26 (or series of rings) whose turns may be kept at fixed distances apart by welding them to metal rods 27 which extend through the core in directions parallel to the axis of the wheel. Another reinforcing helix or series of rings is shown at 28. The turns are attached to rods 27'. With the aid of forms to support the bushing and metal reinforcements and to limit the flow of concrete adjacent the openings 29, the concrete mix may be poured into the central opening of the wheel and around the flanges 25 of the supporting rings and the reinforcing helices. Tie rods 31 can be used to connect the two reinforcing systems from 27 to 27'.

After the concrete has hardened a driving shaft may be inserted through the bushings 24 and sleeve 23, and driving flanges are screwed on to threaded portions of the shaft which are threaded oppositely as in Figure 11 so that increased torque on the wheel causes tightening of the driving flanges against the sides of the wheel.

One of the principal advantages of the abrasive wheel whose method of manufacture has just been described is the ease with which the abrasive segments may be assembled on the supporting rings and the ease with which the abrasive annuli may be brought together to form the complete abrasive rim.

Another advantage is to be found in the security with which the abrasive blocks are gripped by the clamping plates, the pressure applied to a dovetailed base by the clamping base being applied in a direction which is not widely different from the normal to the surfaces of contact.

Still another advantage of the wheel structure described is the ease with which broken or cracked segments may be removed and replaced. It is generally difficult to remove a single cracked or broken segment of an abrasive wheel without injuring a number of adjacent segments in various directions, especially where it is necessary to use a chisel and hammer extensively with resultant shocks that are transmitted throughout the whole wheel.

In the case of the present wheel the removal of a defective segment is greatly facilitated by the pin connections between the clamping plates 5 of the reinforced segments and the supporting ring 14. In removing a segment from the side of the wheel the bolts 19 and the washers 18 are removed from the outer clamping plate for the segment which is to be removed. The removal of the washers 18 makes the pins 15 accessible so that a threaded rod may be inserted in the tapped hole 32 in the end of each pin 15 and the pin pulled out with the further aid of other tools if necessary. In the assembly of the wheel it is advisable to use a plurality of non-corrosive steel pins to prevent rusting and to facilitate removal of a pin where necessary in replacing a segment. After the pins have been removed, the injured segment is only held by the comparatively weak joint material between adjacent segments, and an injured outer segment may be removed with the aid of a pinch bar inserted between the wheel center and the clamps which are attached to the base of the outer segment to be removed. If an inner segment has to be removed, an adjacent outer segment (or segments) can be removed to make the pins 15 of the inner segment accessible. To reach an inner segment from the side, it is only necessary to remove one of the outer segments in the case where the abrasive wheel is made up of three or four abrasive annuli, that is where there are three or four segments in a direction parallel to the axis. The mounting of the segments in the applicants' pulp wheel is therefore of a character which facilitates the replacement of the injured segments whether the injured segment is located in one of the outer rings of segments or in an inner ring of segments. It is possible to do this in many cases without the expense of removing the wheel from its bearings and flanges.

While it is important that defective segments should be readily replaceable, it is still more important that the segments should be so uniformly distributed on their supports and should be so protected from stresses arising from change of temperature and working conditions that there will be little tendency for the segments to break. The applicants' mounting arrangement makes it comparatively easy to assemble the segments in their proper positions on a supporting ring since such proper circumferential position in any given segment is determined by the alignment of two holes in opposed clamping plates with two holes on opposite flanges of the ring. After a first pin has been inserted for any segment the subsequent insertion of a second pin prevents any tendency of a segment to shift about the axis of the first pin. Temperature stresses in an axial direction are minimized by the use of clamping bolts which have approximately the same coefficient of expansion as the abrasive segments and by the use of thin layers of resilient packing between the metal clamps and the abrasive segments. Temperature stresses in a circumferential direction are minimized by the packing between the adjacent segments and by the packing between the segments and the metal clamps. The broad dovetailed bases of the abrasive segments are strongly supported against centrifugal forces by their respective clamps and by the pin connections between the clamps and the supporting ring.

Figure 12:
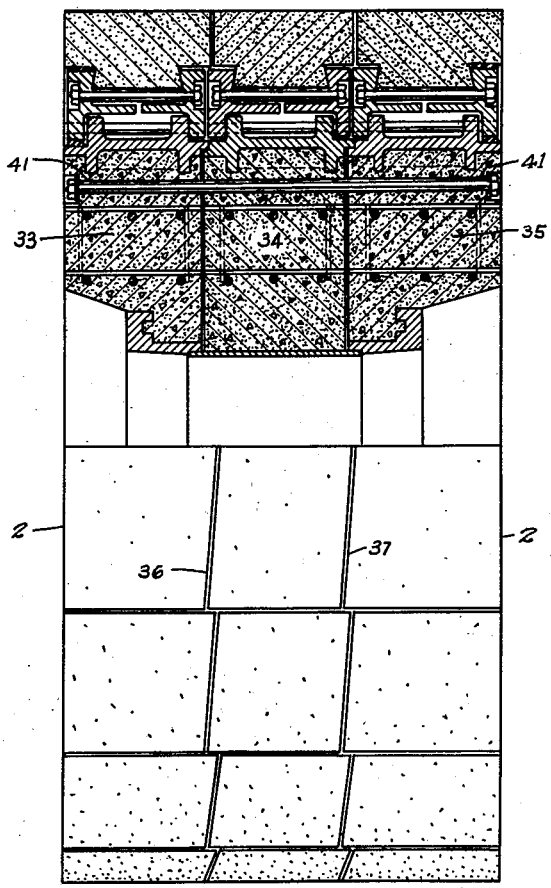
Figure 12 is a view taken in the same direction as Figure 3, but showing a modification in which the abrasive annuli are mounted on separate cores which are held together by means of bolts extending parallel to the axis.

In the modification shown in Figure 12 each of the annuli is built up on a separate core such as those indicated at 33, 34 and 35. The three annuli shown in Figure 12 are assembled separately. The joints 36 and 37 between the annuli have a stepped bias similar to the discontinuous or stepped biased joints shown in the lower part of Figure 3. The three annuli shown in Figure 12 are held together by means of a number of bolts such as indicated at 41. The segments are mounted with the aid of clamping plates on supporting rings in the same manner as in the device shown in Figure 3.

Figure 13:
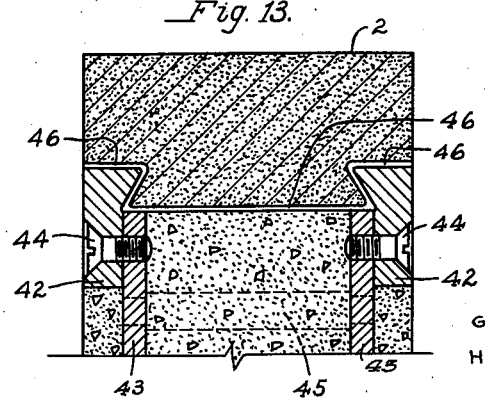
Figure 13 is a fragmentary axial section of an abrasive annulus in which the clamping means for the abrasive segments and the supporting rings are a modification of the corresponding elements shown in Figure 12, the section being taken on the line XIII—XIII of Figure 14.

In the modification shown in Figures 13 and 14, a metal spider is formed from two supporting disks 43 which are maintained in spaced parallel relationship by means of a large number of pins 45 which are indicated by means of dash lines in Figure 13. Each spacing pin has reduced ends which fit closely into holes in the oppositely disposed supporting plates 43. The plates are pressed into contact with the shoulders on the pins as indicated in Figure 13. The ends of the pins 45 are then hammered or peened tight against the supporting plates to secure the supporting plates in position on the pins and to form a unitary framework for the mounting of the abrasive elements. This metal framework can then be mounted on a temporary shaft for convenience in mounting the abrasive elements.

Abrasive elements 2 which are similar in general shape to those shown in Figure 1 are then mounted in succession on the metal spider with the aid of a number of layers of waterproof sheet material 46 which is applied to the dovetail base of each segment to fill the gaps indicated under the segment in Figure 13. Such sheet material can be obtained under the trade name "Oilpac." The material composing the layer 46 is resilient especially when composed of a number of sheets, and the number of sheets is regulated so that, when the opposite clamping members which belong to any particular segment are pressed toward the side plates 43 by means of the screws 44, the segment 2 becomes tightly clamped by the time the clamping members 42 attain contact with the plates 43.

After all of the segments 2 have been mounted to form a continuous abrasive annulus, the assembly is laid down on its side so that its axis is in a vertical position. The shaft can be removed and the wheel placed with its lower side on a flat table. Concrete is then poured within the abrasive annulus to form the core shown in Figure 13. The metal spider comprising the side plates 43 and the spacer pins 45 is embedded in the concrete in the pouring operation.

When it is desired to replace a segment 2 the corresponding clamps 42 are removed by loosening the screws 44 and a new segment is put in place, the thickness of the packing 46 being adjusted so that the new segment will be tightly clamped when the clamping members 42 are screwed into contact again with the side plates 43.

An abrasive wheel can be built up from a number of similar abrasive annuli which have been made in the manner just described in detail, the annuli being mounted in juxtaposition on a common driving shaft.

The abrasive annulus shown in Figures 13 and 14 is of very simple construction. The shapes of the members 42, 43 and 45 lend themselves to mass production methods so that the manufacture of such an abrasive annulus is comparatively inexpensive.

In the modification shown in Figure 15 a plurality of abrasive segments are clamped in an axial direction by means of a pair of clamps 5, the bolts 6' being made of a nickel-steel alloy which has approximately the same coefficient of expansion as the abrasive segments.

In Figure 16 the clamping members 5' are shown as extending along a plurality of segments in a circumferential direction, the number of bolts 6' being increased correspondingly.

In the modification illustrated in Figures 17 and 18 wedge-shaped cross-pieces 50 are bolted to the rings 14. The dovetail projections 51 are held between the cross-pieces 50 by means of a layer of Babbitt metal 52. In this modification the pins 15 are dispensed with.

In the modification shown in Figures 19, 20 and 21 the clamped segments are supported in an axial direction by means of long bolts 55 which are integral with central anchoring member 56. The bolts 55 have substantially the same coefficient of expansion as the abrasive segments. Nuts 57 are used to exert axial pressure on the clamps which hold the abrasive segments. A substantially constant pressure can be maintained on the annular joints of the wheel if the nuts 57 are locked in place.

Many different kinds of abrasive material (such as silicon carbide or fused alumina), and many bonding materials (such as clay, synthetic resins, etc.) can be used in the manufacture of the abrasive segments, and many kinds of packing and cementing materials can be used between adjacent segments and between abrasive segments and the clamping plates. The advantages of the mounting for abrasive segments described in detail above will be appreciated especially by those who have to assemble abrasive segments in large pulp wheel units. The invention is defined within the compass of the following claims.

What is claimed is:

1. A grinding wheel comprising one or more rings of abrasive segments, each segment in each ring being mounted between a pair of individual metal mounting clamps to form a protective metal base for each segment, and means for mounting said clamps on a driving center so that each of a plurality of segments is insertable on and removable from its driving support along with a pair of opposing clamps in firm attachment with the segmental base.

2. A segmental wheel comprising a plurality of segments, each of which is securely and separately mounted between a pair of opposed clamping members adapted to exert pressure on the base of the segment in a direction parallel to the axis of the wheel to provide a separate armored base for each segment, said clamping members in turn being fastened in radially fixed positions upon a rotatable support so that each of a plurality of segments is insertable on and removable from its driving support along with a pair of opposing clamps in firm attachment with the segmental base.

3. A segmental abrasive wheel comprising a support, a segment-supporting ring having inwardly projecting flanges which are anchored in said support and also having flanges which project outwardly from the support, a plurality of abrasive segments arranged as an annulus outside of said supporting ring, separate reinforcing means for each of a plurality of segments comprising a pair of clamping plates attached to the base of each segment and having inwardly projecting flanges arranged along the sides of the outwardly projecting flanges of the supporting ring, and means for rigidly connecting each of said clamping plates to said segment-supporting ring.

4. A segmental abrasive wheel comprising a support, a segment-supporting ring having inwardly projecting flanges which are anchored in said support and also having flanges which project outwardly from the support, a plurality of abrasive segments arranged as an annulus outside of said supporting ring, separate reinforcing means for each of a plurality of segments comprising a pair of clamping plates attached to the base of each segment and having inwardly projecting flanges arranged along the sides of the outwardly projecting flanges of the supporting ring, and removable connecting pins which are fitted into corresponding openings in the inwardly projecting flanges of the clamps and also into the outwardly projecting flanges of the supporting ring.

5. A segmental wheel comprising a plurality of abrasive annuli each of which contains a plurality of abrasive segments each having an inwardly projecting base of dovetail shape with the grooves arranged along each side of the corresponding annulus, a pair of metal clamping plates adapted to engage opposite sides of said projecting base in the case of each abrasive segment, means for pressing said opposite clamping plates toward each other and against the corresponding abrasive segments, a metal supporting annulus inside said abrasive annulus and provided with outer flanges arranged between projections extending inwardly from said clamps, a cement core for said abrasive wheel in which said metal annuli are anchored, and a plurality of connecting pins each of which passes through corresponding holes in one of said supporting annuli and in aligned holes in the adjacent clamping plates.

6. The abrasive wheel described in claim 5 in which the adjacent metal annuli which are anchored in the cement core are provided with axially extending shoulders which engage one another and insure axial alignment of adjacent annuli.

7. The abrasive wheel described in claim 5 in which adjacent abrasive annuli are connected by means of layers of cold-setting cement.

8. A segmental wheel consisting of a plurality of separable annuli, each of said annuli comprising a metal ring having respective radially inwardly projecting and radially outwardly projecting flanges, said inwardly projecting flanges being anchored in a driving support, abrasive segments having bases fastened between opposed clamping members separately fitted to their respective segments, and a plurality of pins passing through registering openings in the bases of said clamping members and also through said outwardly projecting flanges on said rings.

9. A segmental wheel consisting of a plurality of separable annuli, each of said annuli comprising a metal ring having respective radially inwardly projecting and radially outwardly projecting flanges, said inwardly projecting flanges being anchored in a driving support, abrasive segments having bases fastened between opposed clamping members that are separately fitted to their respective segments, a plurality of pins passing through registering openings in the bases of said clamping members and also through said outwardly projecting flanges on said rings, and means for tying together the separable annuli.

10. A segmental wheel consisting of a plurality of separable annuli, each of said annuli comprising a metal ring having respectively radially inwardly projecting and radially outwardly projecting members, said inwardly projecting members being anchored in a driving support, abrasive segments having bases fastened between opposed clamping members that are separately fitted to their respective segments, a plurality of pins passing through registering openings in the bases of said clamping members and also through outwardly projecting members on said rings, and a common driving means for all of said annuli.

SARAH E. RICKARD,
*Administratrix of the Estate of George B. Rickard, Deceased.*
HENRY P. KIRCHNER.